United States Patent
Pitman

[15] 3,655,237
[45] Apr. 11, 1972

[54] REINFORCING APPARATUS

[72] Inventor: James Arnold Pitman, 1114 Indiana Hill Road, Toms River, N.J. 08753

[22] Filed: Sept. 25, 1970

[21] Appl. No.: 75,624

[52] U.S. Cl.............................296/28 R, 280/106 R, 296/28 J
[51] Int. Cl........................................................B62d 21/00
[58] Field of Search.....................296/1 R, 28 R, 28 J, 28 F, 296/31 P; 293/62, 63; 280/106 R

[56] References Cited

UNITED STATES PATENTS

| 1,915,117 | 6/1933 | Baster et al. | 296/28 R |
| 2,436,620 | 2/1948 | Tarbox | 296/28 R |
| 2,612,233 | 9/1952 | Newell | 296/28 R X |

FOREIGN PATENTS OR APPLICATIONS

| 840,018 | 1/1939 | France | 296/28 R |
| 940,982 | 6/1948 | France | 296/28 J |
| 910,251 | 11/1962 | Great Britain | 296/31 P |

*Primary Examiner*—Benjamin Hersh
*Assistant Examiner*—Leslie J. Paperner
*Attorney*—Roger A. Clapp

[57] ABSTRACT

Upper and lower reinforcing apparatus is disclosed in which the upper reinforcing apparatus includes a strut framework adapted for installation in the forward luggage compartment of a rear engine driven automobile and the lower reinforcing apparatus includes two pan braces, two cross braces and two arm braces for exterior installation on said automobile beneath said upper reinforcing apparatus.

7 Claims, 6 Drawing Figures

Patented April 11, 1972 3,655,237
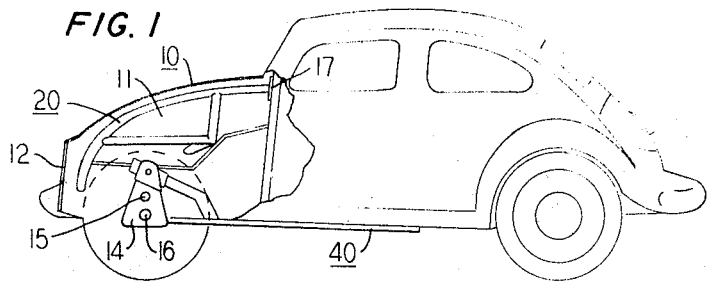
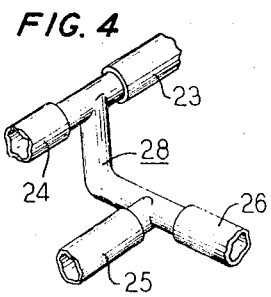
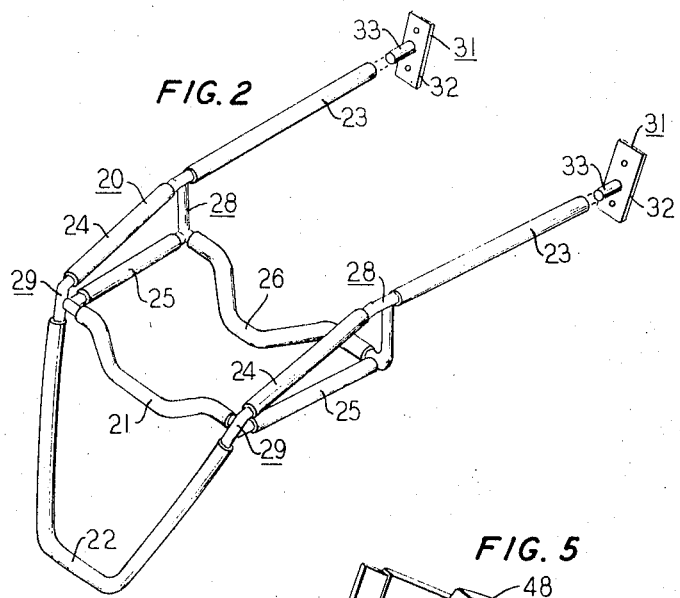
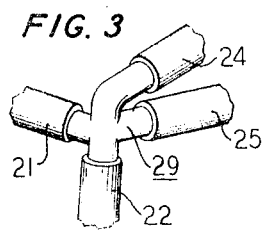
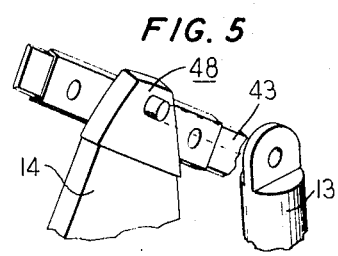
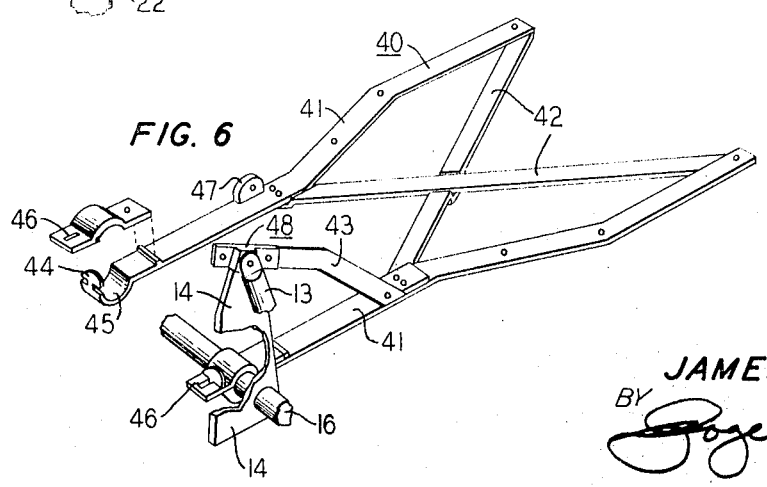
INVENTOR
JAMES A. PITMAN
BY
ATTORNEY

REINFORCING APPARATUS

BACKGROUND OF THE INVENTION

1. FIELD OF THE INVENTION

This invention relates to apparatus for providing structural reinforcement and pertains in particular to impact absorbing apparatus for reinforcing the capacity of an automobile body shell to withstand the impact forces of a collision.

2. DESCRIPTION OF THE PRIOR ART

Passenger safety in a vehicular collision is dependent in large measure upon the degree to which the frame and body shell of the automobile can absorb the collision forces. When the collision occurs between vehicles of two different sizes, however, the frames are mis-aligned and, in the smaller vehicle, the bulk of the impact forces must be absorbed by the body shell. Since the body shell is not principally designed to absorb such forces, passenger safety is jeopardized.

Where the smaller car has an engine in the rear and the luggage compartment in the front, the danger to passengers is further intensified. In such cases, there is little but the body shell to protect the passengers.

Accordingly, one object of this invention is to increase passenger safety in small cars having a front luggage compartment and a rear engine drive.

One way of increasing passenger safety in the type of vehicle described is to increase the structural reinforcement of the body shell. While various forms of structural reinforcement can readily be installed during manufacture, adding such reinforcement to existing vehicles is a difficult problem.

Accordingly, another object of this invention is to provide a way of adding structural reinforcement to the body shell of existing motor vehicles, or motor vehicles under construction, in a quick, inexpensive and convenient manner.

SUMMARY OF THE INVENTION

In accordance with this invention, passenger safety is enhanced by adding impact absorbing structure to the front of a small, rear-engine driven automobile. In a preferred form of the invention, the impact absorbing structure is in kit form and comprises an upper reinforcement and a lower reinforcement which co-operate with each other to bolster the force absorbing capacity of the body shell in the vicinity of the vehicle's front luggage compartment. Specifically, the upper reinforcement is adapted for internal installation within the luggage compartment, while the lower reinforcement is adapted for mounting on the exterior of the lower compartment in a position adjacent to the undercarriage of the motor vehicle and in parallel and approximate registration with the upper reinforcement.

According to one feature of this invention, the upper reinforcement includes parallel support struts joining both ends of an end strut which is shaped to conform to the interior of the luggage compartment, and the lower reinforcement includes two pan braces adapted for attachment to the motor vehicle in parallel and in substantial registration with the two support struts in the upper reinforcement and two arm braces adapted to extend at an upward angle from the pan braces when installed on the motor vehicle.

Other objects and features of this invention will be better understood from the following detailed description when taken in conjunction with the drawing.

BRIEF DESCRIPTION OF THE DRAWING

FIG. 1 illustrates a compact, rear engine automobile taken in elevation with portions of the body broken away to show interior details.

FIG. 2 illustrates, in perspective, an upper reinforcement made in accordance with this invention.

FIG. 3 illustrates, in perspective, a connector for joining parts of the upper reinforcement shown in FIG. 2.

FIG. 4 illustrates another connector for joining other parts of the upper reinforcement shown in FIG. 2.

FIG. 5 illustrates, in partial perspective, a cap for facilitating the attachment of a lower reinforcement to a motor vehicle.

FIG. 6 illustrates, in perspective, a lower reinforcement made in accordance with this invention with parts broken away to show interior details.

DETAILED DESCRIPTION

Referring to FIG. 1, an automobile 10 is shown which contains an upper reinforcement 20 and a lower reinforcement 40. The automobile 10 is one of the so called "compact" types and has an engine in the rear and a luggage compartment 11 in the front partially enclosed by a body shell 12. In addition, it includes a shock absorber 13 (not shown in FIG. 1), a shock absorber tower 14, an upper torsion bar 15, a lower torsion bar 16 and front door posts 17.

The upper reinforcement 20 and lower reinforcement 40 co-operate with each other to absorb forces imparted to the body shell 12 during a collision. Both reinforcements are designed to be used either as original equipment or to be added by the owner after purchase.

The upper reinforcement 20, as shown in FIG. 1, is mounted in the luggage compartment 11. As best seen in FIG. 2, it includes an upper end strut 21, a lower end strut 22, two upper rear struts 23, two upper front struts 24, two lower struts 25, a cross strut 26, and connectors 28 and 29. All of the struts are advantageously made of seamless, mild steel tubing having an outside diameter of approximately 1¼ inches and a wall thickness of approximately 0.037 inches. The connectors are advantageously made of steel tubing.

In the embodiment illustrated, the struts are all pre-cut and pre-formed for use as a kit in combination with the connectors. It will be understood, however, that for factory installation the struts can be combined without connectors as a single unitary structure.

As can best be seen from FIG. 1, the end struts 21 and 22 nestle into the forward end of the luggage compartment 11. Both, moreover, are shaped so as to make contact with the automobile 10 over most of their length. Finally, both are held rigidly in place by the connectors 29.

As best seen from FIGS. 2 and 3, the connectors 29 also join the struts 24 and 25 at one end and hold them in approximate vertical registration with each other. The midsection of the strut 24, as can be seen from FIGS. 1 and 2, can be partially curved to conform to the body shell 12, if necessary. Moreover, it will be readily understood that the particular shape of the struts can be modified to conform to other vehicle configurations. The other ends of the struts 24 and 25 are joined by connectors 28 in co-operation with the cross strut 26.

The connectors are advantageously joined to the struts by a friction fit. Alternatively, however, a clamping or pinning arrangement could readily be designed to supplement the illustrated connectors, if desired. It is essential only that the joints be firm so that the upper reinforcement 20 is rigid throughout.

In many compact vehicles, the front door hinges are located in the front door posts 17. Where such hinges are available, anchor posts 31, as illustrated in FIG. 2, can be used to position the upper reinforcement 20. Each anchor post 31 includes a plate 32, a post 33 and mounting holes. The mounting bolts of the door hinges (not shown) are simply removed and replaced with others long enough to pass through the plate 32. When the posts 33 are inserted in the struts 23 and the plates 32 bolted to the door post 17, the upper reinforcement 20 will be held rigidly in place on the door post 17.

The lower reinforcement 40, in the form shown in FIG. 6, is also suitable for kit use. It comprises two pan braces 41, two cross braces 42, and two arm braces 43. All of the braces are advantageously made of flat steel 1¼ to 2 inches wide and one-fourth to three-eighths inches thick.

As can be seen from FIGS. 1 and 6, the lower reinforcement 40 extends under the automobile 10 and has one end joined to the lower torsion bar 16 adjacent to the point where the torsion bar enters the shock absorber tower 14. As best seen in FIG. 6, each pan brace 41 terminates in a tongue 44 and includes a groove 45 and a strap 46. The strap 46 includes a slot for accepting the tongue 44 and has a bolt hole for attachment to a pan brace 41. When mounted over the torsion bars and bolted down, the straps 46 will hold the pan braces 41 in place.

Each pan brace 41 also includes a number of bolt holes and a lug 47. The bolt holes are located so as to align with pre-existing bolts in the frame of the automobile 10. The pan braces 41 are shaped, and the bolt holes are located, moreover, so that the pan braces will lie generally in parallel and substantially in register with the upper struts 23 and 24 and the lower struts 25 when the upper reinforcement 20 is installed in the automobile 10.

The lug 47 includes a bolt hole for attachment to an arm brace 43. When attached to the lug 47, the arm brace 43 angles upwardly away from the pan brace 41. Moreover, it includes in its mid-section a bend or knee.

As can be seen from FIGS. 5 and 6, the other end of each arm brace 43 is attached to a cap 48 as, for example, by bolts (not shown). As best seen in FIG. 5, the cap 48 is recessed to fit over the end of the shock absorber tower 14 and has a hole for accomodating the mounting bolt used to hold the shock absorber 13 to the shock absorber tower 14.

As best seen in FIG. 6, the cross braces 42 extend between the two pan braces 41 and are held in place by the bolts which anchor the pan braces 41 to the automobile 10.

In a collision, the collapsing body shell 12 will press upon the upper reinforcement 20. Forces from the upper reinforcement 20 are in turn transmitted downwardly to the lower reinforcement 40 and rearwardly to the door posts. The rigidity imparted by the co-operation of these reinforcements will therefore reduce the forces of collision which reach the passenger compartment and thereby add to the safety of passengers in the automobile 10.

In summary, a structural reinforcing arrangement has been disclosed which can be installed in an automobile to enhance passenger safety either during manufacture or thereafter as a kit. It will be understood, however, that while only one embodiment has been illustrated, it is merely illustrative of the principles of the invention and others falling within the scope of the invention will readily occur to those skilled in the art.

What I claim is:

1. Impact absorbing apparatus for reinforcing a portion of body shell which encloses a luggage compartment located forwardly of the front door posts of an automobile comprising:

Upper reinforcing means for installation within said luggage compartment, said upper reinforcing means including parallel support struts joined to both ends of a curved end strut, said support struts including anchor means bracing said struts against a front door post and said end strut being configured to make contact along a substantial part of its length with said portion of body shell when said parallel support struts are braced against said front door posts, and Lower reinforcing means for exterior installation beneath said motor vehicle adjacent to and beneath said luggage compartment, said lower reinforcing means including a pair of pan braces, attaching means for affixing said pan braces on the exterior of said motor vehicle adjacent to the undercarriage in parallel and approximate registration with said support struts, a pair of intersecting cross braces extending from one pan brace to the other and a pair of arm braces, each of said arm braces including means for attaching one end to a pan brace, a mid-section angling away from said pan brace and cap means for attaching the other end beneath said body shell at a point adjacent to the location occupied by said end strut when installed in said luggage compartment whereby said upper and lower reinforcing means, when installed in said motor vehicle, will cooperatively resist compressive forces imposed upon said portion of body shell when said motor vehicle sustains a front end collision.

2. Impact absorbing apparatus in accordance with claim 1 wherein said cap means comprises a metal cap recessed to accomodate the upper end of said shock absorber tower and having a hole for accomodating a shock absorber mounting bolt and means for making rigid attachment to an arm brace.

3. Impact absorbing apparatus in accordance with claim 1 wherein the mid-section of each arm brace includes an angle bend.

4. Impact absorbing apparatus in accordance with claim 1 wherein each pan brace is Z-shaped, has bolt holes spaced to accomodate existing bolts in the under portion of said motor vehicle and includes gripping means for gripping the front undercarriage of a motor vehicle.

5. Impact absorbing apparatus in accordance with claim 4 wherein each of said gripping means includes a section curved into a U shape for engagement with a portion of said automobile, a tongue at the end of said section and a strap having a slot to accept said tongue and means for attaching said strap to a pan brace.

6. Impact absorbing apparatus in accordance with claim 1, wherein said support struts are made of hollow tubing.

7. Impact absorbing apparatus in accordance with claim 6 wherein said anchor means comprises a post for insertion into the end of a strut and a plate for engaging the mounting hardware of a door hinge located on a front door post.

* * * * *